(12) United States Patent
Conq

(10) Patent No.: US 12,092,495 B2
(45) Date of Patent: Sep. 17, 2024

(54) VARIABLE INDUCTIVE DISPLACEMENT SENSOR, ASSOCIATED DEVICE, SYSTEM AND AIRCRAFT

(71) Applicant: SAFRAN ELECTRONICS & DEFENSE, Paris (FR)

(72) Inventor: Mathieu Conq, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/823,788

(22) Filed: Aug. 31, 2022

(65) Prior Publication Data

US 2023/0068680 A1 Mar. 2, 2023

(30) Foreign Application Priority Data

Aug. 31, 2021 (FR) ...................................... 2109083

(51) Int. Cl.
*G01D 5/22* (2006.01)
*H01F 29/12* (2006.01)

(52) U.S. Cl.
CPC ........... *G01D 5/2291* (2013.01); *H01F 29/12* (2013.01)

(58) Field of Classification Search
None
See application file for complete search history.

(56) References Cited

U.S. PATENT DOCUMENTS

| | | | | |
|---|---|---|---|---|
| 4,467,320 A * | 8/1984 | McPhee | ............... | G01D 5/2291 318/657 |
| 4,982,156 A | 1/1991 | Lewis et al. | | |
| 5,180,979 A * | 1/1993 | Frazzini | ............... | G01D 5/2216 340/870.36 |
| 6,864,808 B2 * | 3/2005 | McBrien | .............. | G01D 5/2266 341/20 |
| 2004/0112148 A1 * | 6/2004 | Sakai | ................. | B62D 15/0215 73/862.331 |
| 2009/0222148 A1 * | 9/2009 | Knotts | ................. | G05D 1/0038 701/2 |
| 2012/0109562 A1 * | 5/2012 | Yabuguchi | ............. | H02K 24/00 702/87 |
| 2016/0214730 A1 * | 7/2016 | Nouhaud | ............... | B64D 31/04 |

FOREIGN PATENT DOCUMENTS

EP 0 039 260 A1 11/1981
WO 2015/028963 A1 3/2015

OTHER PUBLICATIONS

Huang Junhua et al.; LVDT transformer and displacement sensor; Publication •Jul. 14, 2020; Wuhan Aviation Sensing Tech Co Ltd; CN211016743U; IPC G01B7/02; H01F27/28; H01F29/10. (Year: 2020).*
France Search Report and Written Opinion mailed Apr. 27, 2022, issued in Application No. FR2109083, filed Aug. 31, 2021, 7 pages.

* cited by examiner

*Primary Examiner* — Nasima Monsur
(74) *Attorney, Agent, or Firm* — CHRISTENSEN O'CONNOR JOHNSON KINDNESS PLLC

(57) ABSTRACT

A variable inductive displacement sensor includes a primary excitation coil, a first secondary coil, and a second secondary coil. The primary excitation coil is configured to generate a variable magnetic field, and the first and second secondary coils are configured to each generate a signal induced by the variable magnetic field. The primary coil and the first and second secondary coils each have one end which is intended to be connected to a common ground.

5 Claims, 7 Drawing Sheets

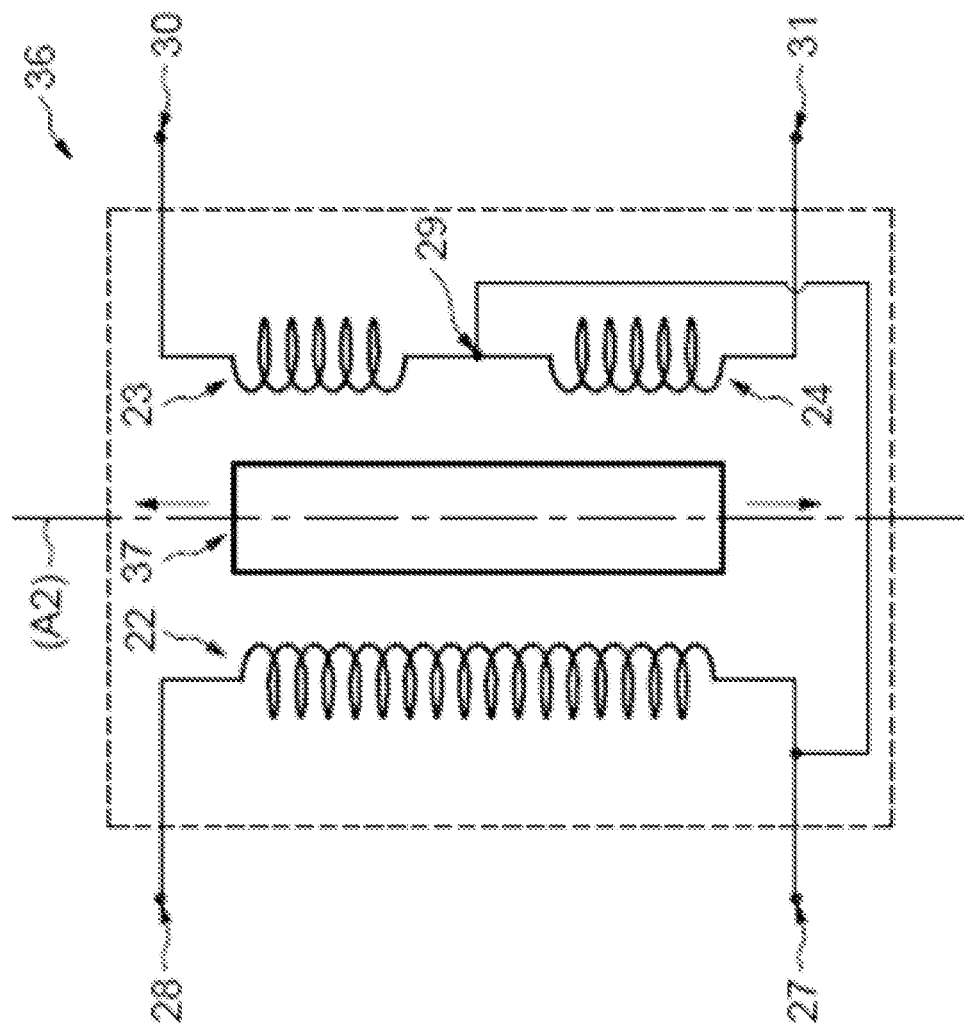

VARIABLE INDUCTIVE DISPLACEMENT SENSOR, ASSOCIATED DEVICE, SYSTEM AND AIRCRAFT

CROSS-REFERENCE TO RELATED APPLICATION

This application claims priority to FR 2109083, filed Aug. 31, 2021, the disclosure of which is hereby expressly incorporated by reference herein in its entirety.

TECHNICAL FIELD

The disclosure relates to the displacement sensors, and more particularly variable differential inductive displacement sensors known by the acronym VDT ("variable differential transformer").

The disclosure further relates to reactor monitoring devices and gas monitoring devices equipped with such sensors, as well as monitoring systems comprising one of the devices and aircraft equipped with such systems.

BACKGROUND

Generally, in order to accurately and reliably determine the displacement of a mechanical member, for example the position of a servo valve, a variable differential inductive displacement sensor is used to determine the displacement and the position of the movable portion of the mechanical member.

FIGS. 1 and 2 illustrate an exemplary embodiment and a block diagram of a linear differential inductive displacement sensor 1, known by the acronym LVDT "linear variable differential transformer," according to the state of the art.

The sensor 1 comprises a primary excitation coil 2, a first secondary coil 3, a second secondary coil 4 and a magnetic core 5 comprising a rod made of a magnetic material.

The primary coil 2 and the first and second secondary coils 3, 4 are disposed in a cylindrical envelope 11 of the sensor 1 with a central axis (A).

The primary coil 2 extends inside the cylindrical envelope 11 over the entire length of the envelope 11. The secondary coils 3, 4 are superimposed on the primary coil 2 and separated from the primary coil 2 by an electrical 5 insulator such that the cumulative length of the first and second secondary coils 3, 4 along the axis (A) is equal to the length of the primary coil 2 along the axis (A).

The magnetic core 5 is disposed in the center of the coils 2, 3, 4, and translates linearly along the axis (A) relative to the coils 2, 3, 4.

The primary coil 2 comprises two connection terminals 6, 7 connected to a variable current source delivering for example a sinusoidal current. The first and second secondary coils 3, 4 are connected by one of the ends thereof to a connection point connected to a connection terminal 8, and the second ends of the first and second secondary coils 3, 4 are each connected to a different connection terminal 9, 10.

When the primary coil 2 is supplied by the current source and, depending on the displacement of the core 5 along the longitudinal displacement axis (A) relative to the primary coil 2 and to the secondary coils 3, 4, a current is induced in each of the first and second secondary coils 3, 4.

A conditioning unit connected to the terminals 8, 9 and 10 of the secondary coils 3, 4 determines the displacement and the position of the core 5 relative to the coils 2, 3, 4 depending on the currents induced in the first and second secondary coils 3, 4.

In order to implement the sensor 1, it is necessary to connect the terminals 6, 7, 8, 9, 10 of the primary coil 2 and of the secondary coils 3, 4 to different electrical connection wires, requiring providing five connection interfaces on the sensor 1, each of the terminals 6, 7, 8, 9, 10 being connected to a different connection interface.

The connection interfaces of the sensor 1 are respectively connected to connection interfaces of the conditioning unit by a connection wire.

The creation of five connection interfaces on the sensor 1 increases the space requirement and the weight of the sensor 1.

Furthermore, when the sensor 1 is mounted in an aircraft, the electrical connection wires are grouped in a harness comprising a multitude of other electrical connection wires, in particular for connecting other sensors of the aircraft. Such an aircraft harness extends over a few meters such that the weight of the harness is not negligible, typically a few kilograms.

In addition, as a multitude of wires are grouped in the same harness, it is complex to identify a faulty wire.

The aim of the disclosure is to overcome all or part of these drawbacks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In view of the foregoing, the disclosure relates to a variable inductive displacement sensor, comprising a primary excitation coil, a first secondary coil, and a second secondary coil, the primary excitation coil being configured to generate a variable magnetic field and the first and second secondary coils being configured to each generate a signal induced by the variable magnetic field.

The connections of one of the ends of the primary coil, of the first secondary coil and of the second secondary coil are electrically connected to a common ground allowing reducing the number of wired connection interface of the sensor, by eliminating one connection.

There is thus a connection interface on the sensor, a connection interface of the processing unit, and a connection wire connecting the interfaces at least to be made. Considering the considerable number of variable inductive displacement sensors provided in an aircraft, this results in a non-negligible gain in cost and mass.

The elimination of a connection interface on the sensor and on the processing unit allows reducing the space requirement of the sensor and the processing unit, thus facilitating their integration into the aircraft.

Furthermore, when a multitude of connection wires of several sensors are grouped in a harness, the reduction in the number of connections produced by the disclosure results in a reduction in the number of wires to pass through the harness: the section of the harness can be reduced, and the mass of the harness is reduced. Furthermore, as the number of wires to pass through the harness is reduced, the production of the harness and the routing of the harness in the aircraft are then facilitated.

Also, the detection of a failure of one of the wires of the harness is facilitated.

Preferably, the sensor is of the linear variable inductive displacement type, and further comprising a magnetic core including a magnetic rod, the primary excitation coil, the first secondary coil and the second secondary coil surrounding the rod and extending along the rod, the rod translating in the coils, the induced signals generated by the first and second secondary coils being indicative of the position of the rod in the coils.

Advantageously, the sensor is of the rotary variable inductive displacement type, in which the primary excitation coil, the first secondary coil and the second secondary coil form a torus, each of the coils defining an angular sector of the torus relative to the central axis of the torus, a magnetic core being disposed at the center of the torus and rotating about the central axis of the torus, the induced signals generated by the first and second secondary coils being indicative of the position of the core in the torus, the magnetic core being intended to be connected to a rotor and the torus being intended to be disposed on a stator housing the rotor.

Preferably, the sensor is of the resolver type, in which the primary coil is intended to be disposed on a rotor, and the first and second secondary coils are intended to be disposed in a stator housing the rotor, the first and second secondary coils being perpendicular to each other such that the induced signals generated by the first and second secondary coils are indicative of the position of the rotor relative to the stator.

A monitoring device for an aircraft is also proposed, including a servo valve including a movable portion and a portion which is fixed relative to the movable portion, and a sensor of the linear variable inductive displacement type as previously defined, the magnetic core being connected to the movable portion.

A monitoring device for an aircraft is also proposed, including a sensor of the rotary variable inductive displacement type as previously defined, and a throttle including a rotor and a stator housing the rotor, the magnetic core being connected to the rotor and the first and second secondary coils being disposed on the stator.

A monitoring system for an aircraft is also proposed, including a monitoring device as previously defined, and a processing unit configured to supply the primary coil and analyze the signals induced by the first and second secondary coils in order to determine the position of the magnetic core relative to the first and second secondary coils, the ends of the primary coil, of the first secondary coil and of the second secondary coil being connected to a common ground of the processing unit.

A gas monitoring device for an aircraft is also proposed, including a resolver type sensor as previously defined, and a throttle including a rotor and a stator housing the rotor, the primary coil being disposed on the rotor and the first and second secondary coils being disposed on the stator.

There is also proposed a monitoring system for an aircraft including a monitoring device as previously defined, and a processing unit configured to supply the primary coil and analyze the signals induced by the first and second secondary coils in order to determine the position of the primary coil relative to the first and second secondary coils, the ends of the primary coil, of the first secondary coil and of the second secondary coil being connected to a common ground of the processing unit.

An aircraft is also proposed including at least one monitoring system as defined above.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIGS. 6 and 7 schematically illustrate an exemplary embodiment of a linear variable inductive displacement sensor according to the disclosure.

DETAILED DESCRIPTION

While illustrative embodiments have been illustrated and described, it will be appreciated that various changes can be made therein without departing from the spirit and scope of the disclosed subject matter.

On board an aircraft, systems and monitoring devices are provided to drive different members of the aircraft.

The systems and devices are based in particular on information provided by sensors, in particular position sensors of movable members of the aircraft.

By way of non-limiting example, such sensors are found in particular in the following components: throttle and members for managing the fuel flow rate in the reactors.

All these sensors must in particular be connected, in an adequate manner, to allow their operation as well as the transmission and exploitation of the position information thus obtained.

Figure 3:
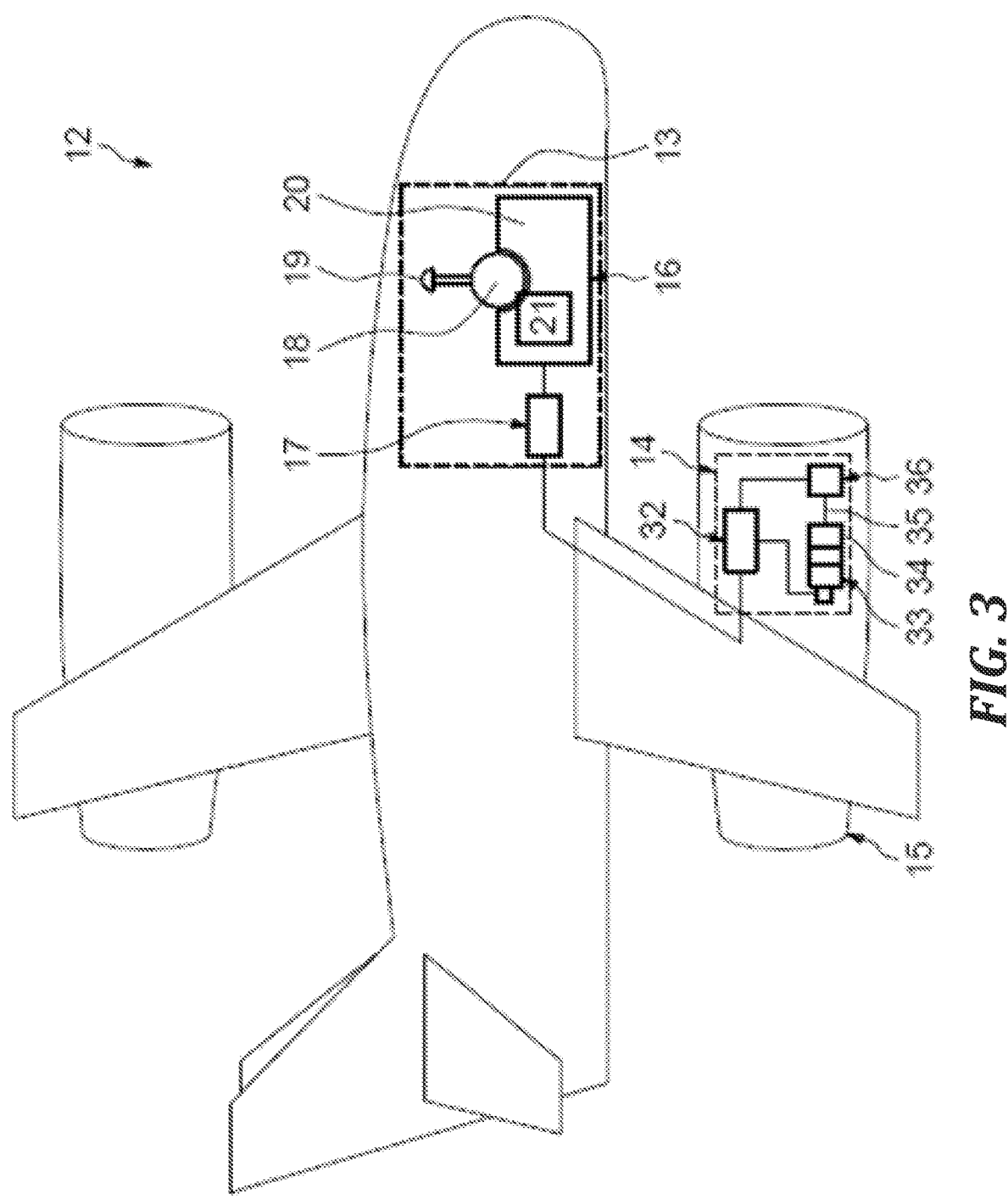
FIG. 3 schematically illustrates an aircraft to which the disclosure can be applied.

Reference is made to FIG. 3 which schematically illustrates an aircraft 12 including a first monitoring system 13 integrated into the cockpit of the aircraft and a second monitoring system 14 integrated into a jet engine 15 of the aircraft.

The first monitoring system 13 comprises an aircraft monitoring device including a throttle 16 connected to a first processing unit 17.

The first monitoring system 13 comprises for example an aircraft gas monitoring device including a throttle 16.

The throttle 16 comprises a rotor 18 connected to a lever 19, and a stator 20 housing the rotor 18 such that a pilot of the aircraft 12 adjusts the thrust provided by the jet engine 15 by pushing or pulling the lever 19.

The throttle 16 further comprises a variable inductive displacement sensor 21 connected to the first processing unit 17.

Of course, the first monitoring system 13 can drive other members of the aircraft.

Figure 4:
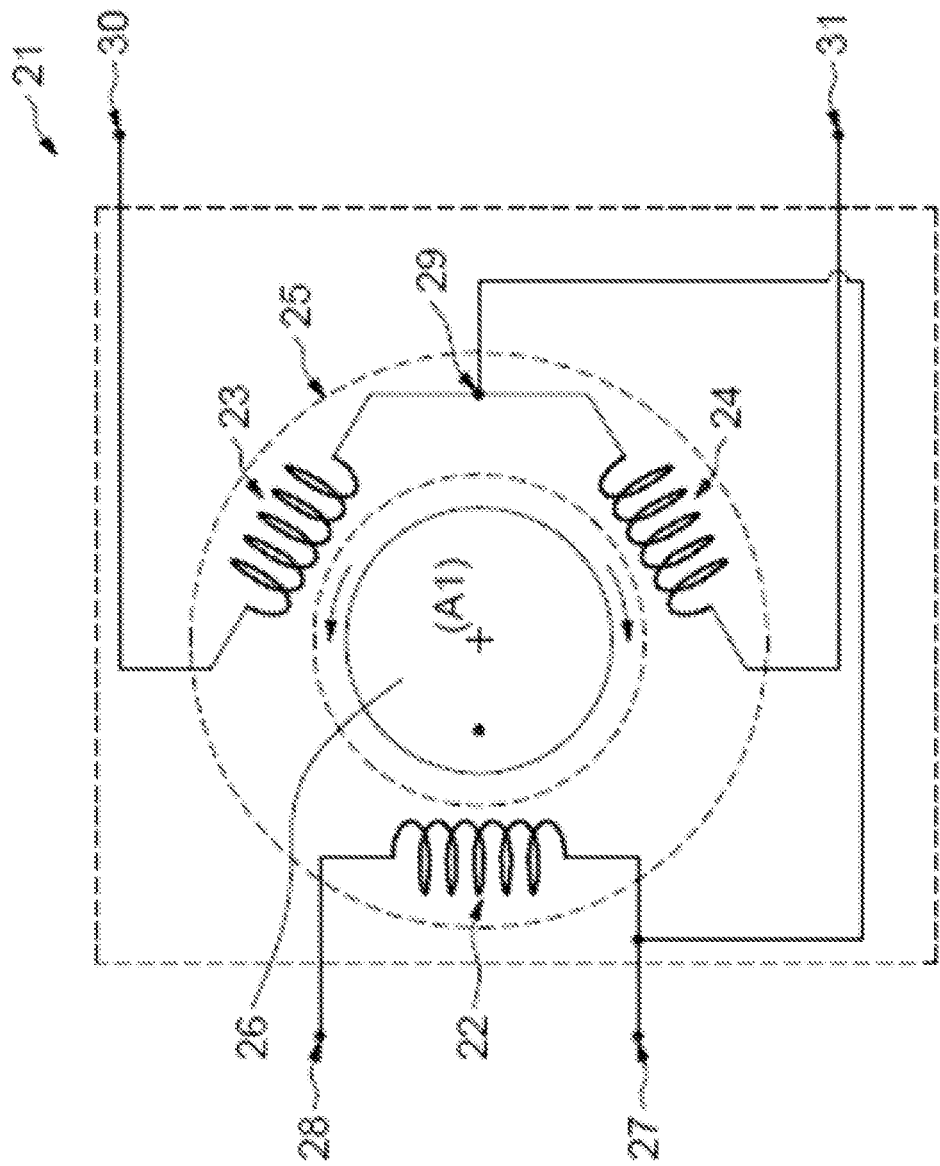
FIG. 4 illustrates a block diagram of a first embodiment of a rotary variable inductive displacement sensor according to the disclosure.

FIG. 4 illustrates a block diagram of a first embodiment of the sensor 21 of the rotary variable inductive displacement type.

The sensor 21 comprises a primary excitation coil 21, a first secondary coil 23 and a second secondary coil 24 forming a torus 25 including a central axis (A1).

The torus 25 is housed in the stator 20 of the throttle 16.

Each of the primary 22 and secondary 23, 24 coils defines an angular sector of the torus 25 relative to the central axis (A1).

The sensor 21 further comprises a magnetic core 26 disposed in the center of the torus and rotating about the central axis (A1).

The core 26 is connected to the rotor 18 of throttle 16.

The primary coil comprises, at each of the ends thereof, a connection terminal 27, 28.

The adjacent ends of the first and second secondary coils 23, 24 are connected to each other at a common point 29.

The free ends of the first and second secondary coils 23, 24 are connected to connection terminals 30, 31.

The common point 29 is connected to a first connection terminal 27 of the primary coil 22.

The sensor 21 further comprises four connection interfaces, each of the connection terminals 27, 28 of the primary coil 22 and of the connection terminals 30, 31 of the secondary coils 23, 24 being connected to the processing unit 17 via a connection interface and a different connection wire.

The first connection terminal 27 of the primary coil 22 is connected to an electrical ground of the first processing unit 17.

The connection of the common point 29 to the first connection terminal 27 of the primary coil 22 creating a common ground allows reducing the number of connections of the sensor 21 to the first processing unit 17 by eliminating the connection of the mid-point 29 to the processing unit 17 relative to a sensor of the prior art.

Relative to the state of the art, this allows eliminating a connection interface of the sensor 21, a connection interface of the processing unit 17, and a connection wire connecting the interfaces relative to a sensor and a processing unit.

The sensor 21 comprises four connection interfaces unlike a sensor of the prior art comprising five connection interfaces.

The elimination of the interfaces allows reducing the space requirement of the sensor 21 and of the first processing unit 17, facilitating their integration into the aircraft.

When a multitude of connection wires of several sensors 21 are grouped in a harness, the elimination of one connection wire per sensor allows reducing the mass and the section of the harness by the same amount, facilitating the routing of the harness in the aircraft, simplifying the production of the harness and the failure detection of a wire of the harness.

The mass of the first monitoring system 13 is thus reduced and its production is simplified.

The first processing unit 17 powers the excitation coil 22 by a variable signal, for example a sinusoidal current, such that the excitation coil 22 generates a variable magnetic field.

Under the effect of the magnetic field, a signal, for example a current, is induced in each secondary coil 23, 24.

The characteristics of the signals induced in the secondary coils 23, 24 are indicative of the position of the magnetic core 26 in the torus 25.

The first processing unit 17 determines the position of the magnetic core 26 relative to the first and second secondary coils 23, 24 in the stator 20 by analyzing the signals induced by the first and second secondary coils 23, 24.

Figure 5:
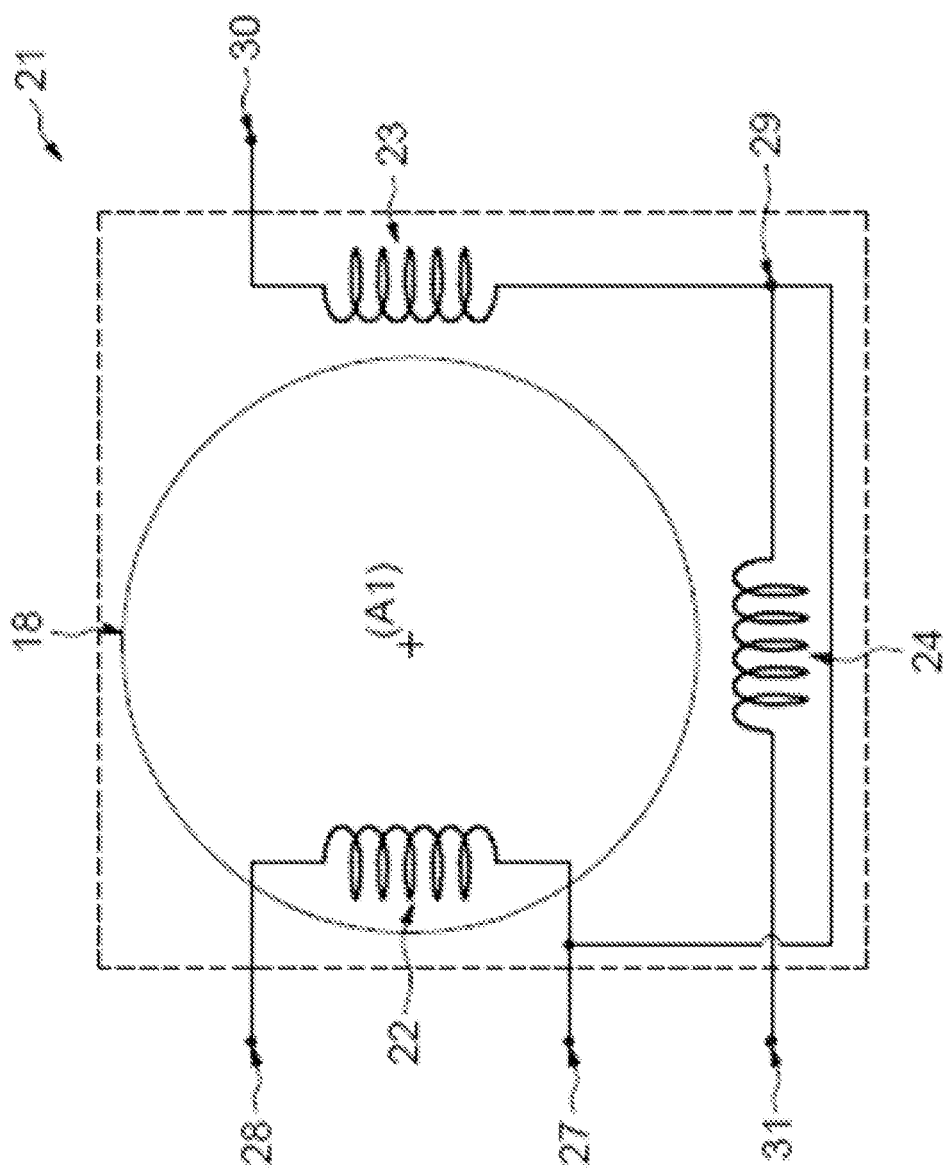
FIG. 5 illustrates a block diagram of a second embodiment of a rotary variable inductive displacement sensor according to the disclosure.

FIG. 5 illustrates a block diagram of a second embodiment of the resolver type rotary sensor 21.

The primary 22 and secondary 23, 24 coils are found.

Unlike the first embodiment of the sensor 21 shown in FIG. 4, the primary coil 22 is disposed on the rotor 18, and the first and second secondary coils 23, 24 are disposed perpendicular to each other in the stator 20 such that during the rotation of the rotor 18, the magnetic field generated by the primary coil 22 creates the signals induced in the secondary coils 23, 24. The first processing unit 17 determines the position of the primary coil 22 relative to the secondary coils 23, 24 and deduces therefrom the position of the rotor 18 relative to the stator 20.

Reference is now made to FIG. 3.

The second monitoring system 14 is for example of the FADEC ("Full Authority Digital Engine Control") type ensuring in particular the management of the jet engine 15 from the position of the throttle 16 via the first processing unit 17, parameters of the jet engine 15 and other information delivered by members of the aircraft 12.

Of course, the second monitoring system 14 can drive other members of the aircraft.

The second monitoring system 14 comprises a second processing unit 32 connected to the first processing unit 17, a servo valve 33 including a fixed portion 34 and a movable portion 35, and a linear variable inductive displacement sensor 36.

The servo valve 33 controls for example a fuel metering device of the jet engine 15 in order to monitor the thrust delivered by the jet engine 15.

The second processing unit 32 drives the movable portion 35 of the servo valve 33 in order to control the fuel metering device, and determines the position of the movable portion 35 relative to the fixed portion 34 from signals emitted by the linear sensor 36.

Of course, the servo valve 33 can control other members of the jet engine 15, for example and without limitation the opening of discharge valves, valves of the stator of the jet engine 15.

Figure 6:
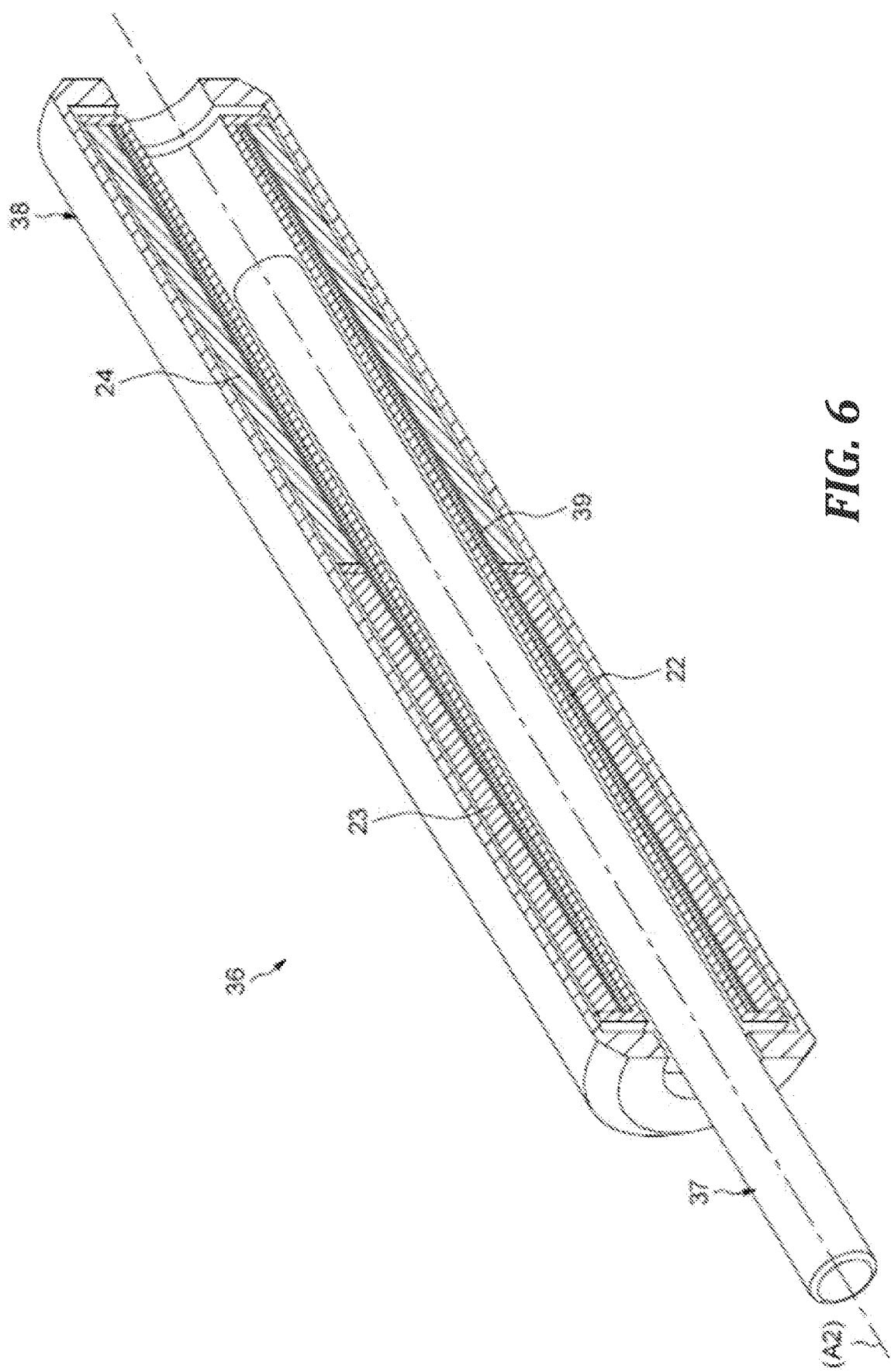

FIGS. 6 and 7 schematically illustrate an embodiment and an example of a block diagram of the linear sensor 36 comprising the primary coil 22 and the secondary coils 23, 24.

The connection terminals 27, 28 of the primary coil 22 and the connection terminals 30, 31 of the secondary coils 23, 24 are connected to the four connection interfaces, as described previously.

The connection terminals 27, 28 of the primary coil 22 and the connection terminals 30, 31 of the secondary coils 23, 24 are connected to the second processing unit 32 via connection interfaces and connection wires.

The primary coil 22 and the first and second secondary coils 23, 24 are disposed in a cylindrical envelope 38 of the sensor 36 with a central axis (A2) (FIG. 6).

The primary coil 22 extends inside the cylindrical envelope 38 over the entire length of the envelope 38 along the central axis (A2). The secondary coils 23, 24 are superimposed on the primary coil 22 and separated from the primary coil 22 by an electrical insulator 39 such that the cumulative length of the first and second secondary coils 23, 24 along the central axis (A2) is equal to the length of the primary coil 22 along the central axis (A2).

The linear sensor 36 further comprises a magnetic core 37 including a rod.

The magnetic core 37 is disposed in the center of the coils 22, 23, 24, and translates linearly along the central axis (A2) relative to the coils 22, 23, 24.

Figure 1:
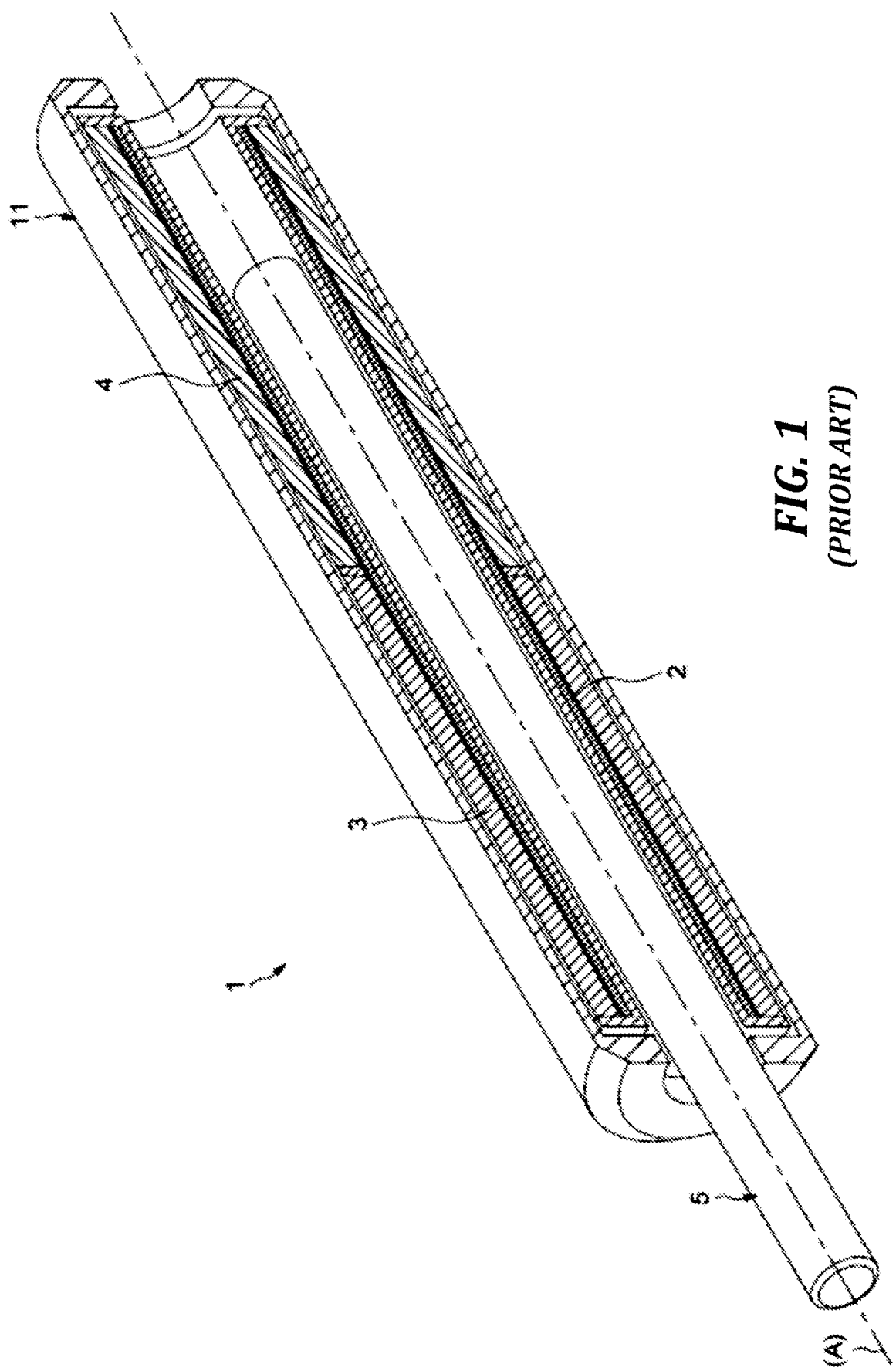
FIGS. 1 and 2 schematically illustrate a linear differential inductive sensor according to the state of the art.
Figure 2:
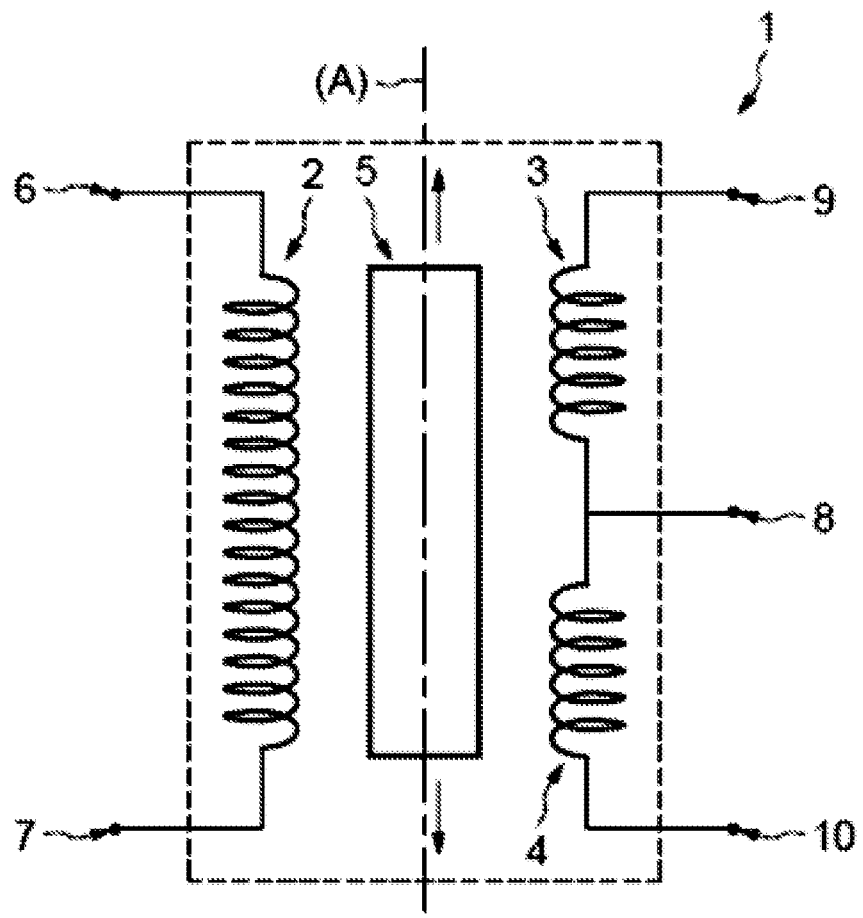

The core 37 is connected to the movable portion 35 of the servo valve 33 (FIG. 2).

As previously described and with reference to FIG. 7, the secondary coils 23, 24 are connected by the common point 29, itself connected to the first terminal 27 of the primary coil 22 such that the linear sensor 36 comprises four connection interfaces unlike a sensor of the prior art comprising five connection interfaces.

With reference to FIG. 3, the second processing unit 32 powers the primary coil 22 by a variable signal, for example a sinusoidal current, such that the primary coil 22 generates a variable magnetic field.

Under the effect of the magnetic field, a signal, for example a current, is induced in each secondary coil 23, 24.

The characteristics of the signals induced in the secondary coils 23, 24 are indicative of the position of the magnetic core 37 relative to the coils 22, 23, 24.

The second processing unit 32 determines the position of the movable portion 35 connected to the core 37 relative to the fixed portion 34 of the servo valve 33 by analyzing the signals induced by the first and second secondary coils 23, 24.

Of course, the rotary variable inductive displacement sensors 21 and the linear variable inductive displacement sensors 36 can be implemented in other applications.

The embodiments of the invention in which an exclusive property or privilege is claimed are defined as follows:

1. An aircraft, comprising:
    a first monitoring system integrated into a cockpit of the aircraft, the first monitoring system having an aircraft monitoring device that includes:
        a throttle connected to a first processing unit, the throttle including a rotor connected to a lever, and a stator housing the rotor such that a thrust provided by a jet engine is selectively controlled by pushing and pulling the lever; and
        a rotary variable inductive displacement sensor, comprising a primary excitation coil, a first secondary coil, and a second secondary coil, the primary excitation coil being configured to generate a variable magnetic field, and the first and second secondary coils being configured to each generate a signal induced by the variable magnetic field, wherein adjacent ends of the first and second secondary coils are connected to each other at a common point connected to a first connection terminal of the primary coil, the first connection terminal being configured to be connected to a common ground, wherein the common point and a connection between the common point and the first connection terminal are disposed within the sensor, wherein the primary excitation coil, the first secondary coil and the second secondary coil form a torus, each of the coils defining an angular sector of the torus relative to a central axis of the torus, a magnetic core being disposed at a center of the torus and rotating about the central axis of the torus, the induced signals generated by the first and second secondary coils being indicative of a position of the core in the torus, the magnetic core being configured to be connected to a rotor and the torus being configured to be disposed on a stator housing the rotor, the magnetic core being connected to the rotor and the first and second secondary coils being disposed on the stator; and
    a second monitoring system integrated into the jet engine of the aircraft, the second monitoring system having:
        a second processing unit connected to the first processing unit;
        a servo valve including a fixed portion and a movable portion; and
        a linear variable inductive displacement sensor, comprising a primary excitation coil, a first secondary coil, and a second secondary coil, the primary excitation coil being configured to generate a variable magnetic field, and the first and second secondary coils being configured to each generate a signal induced by the variable magnetic field, wherein adjacent ends of the first and second secondary coils are connected to each other at a common point connected to a first connection terminal of the primary coil, the first connection terminal being configured to be connected to a common ground, wherein the common point and a connection between the common point and the first connection terminal are disposed within the sensor, the sensor further comprising a magnetic core including a magnetic rod, the primary excitation coil, the first secondary coil and the second secondary coil surrounding the rod and extending along the rod, the rod translating in the coils, the induced signals generated by the first and second secondary coils being indicative of the position of the rod in the coils, the magnetic core being connected to the movable portion,
    the second monitoring system being configured to manage the jet engine of the aircraft from a position of the lever via the first processing unit, the servo valve being configured to control a fuel metering device of the jet engine in order to monitor the thrust delivered by the jet engine,
    the second processing unit being configured to drive the movable portion of the servo valve and to determine the position of the movable portion relative to the fixed portion from signals emitted by the linear variable inductive displacement sensor.

2. The aircraft according to claim 1, wherein the first processing unit is configured to supply the primary coil and to analyze signals induced by the first and second secondary coils in order to determine a position of the magnetic core relative to the first and second secondary coils, the ends of the primary coil, of the first secondary coil and of the second secondary coil being connected to a common ground of the first processing unit.

3. An aircraft, comprising:
    a first monitoring system integrated into a cockpit of the aircraft, the first monitoring system having an aircraft monitoring device that includes:
        a throttle connected to a first processing unit, the throttle including a rotor connected to a lever, and a stator housing the rotor such that a thrust provided by a jet engine is selectively controlled by pushing and pulling the lever; and
        a resolver-type variable inductive displacement sensor, comprising a primary excitation coil, a first secondary coil, and a second secondary coil, the primary excitation coil being configured to generate a variable magnetic field, and the first and second secondary coils being configured to each generate a signal induced by the variable magnetic field, wherein adjacent ends of the first and second secondary coils are connected to each other at a common point connected to a first connection terminal of the primary coil, the first connection terminal being configured to be connected to a common ground, wherein the common point and a connection between the common point and the first connection terminal are disposed within the sensor, wherein the primary coil is configured to be disposed on a rotor, and the first and second secondary coils are configured to be disposed in a stator housing the rotor, the first and second secondary coils being perpendicular to each other such that induced signals generated by the first and second secondary coils are indicative of a position of the rotor relative to the stator; and
    a second monitoring system integrated into the jet engine of the aircraft, the second monitoring system having:

a second processing unit connected to the first processing unit;

a servo valve including a fixed portion and a movable portion; and a linear variable inductive displacement sensor, comprising a primary excitation coil, a first secondary coil, and a second secondary coil, the primary excitation coil being configured to generate a variable magnetic field, and the first and second secondary coils being configured to each generate a signal induced by the variable magnetic field, wherein adjacent ends of the first and second secondary coils are connected to each other at a common point connected to a first connection terminal of the primary coil, the first connection terminal being configured to be connected to a common ground, wherein the common point and a connection between the common point and the first connection terminal are disposed within the sensor, the sensor further comprising a magnetic core including a magnetic rod, the primary excitation coil, the first secondary coil and the second secondary coil surrounding the rod and extending along the rod, the rod translating in the coils, the induced signals generated by the first and second secondary coils being indicative of the position of the rod in the coils, the magnetic core being connected to the movable portion, the second monitoring system being configured to manage the jet engine of the aircraft from a position of the lever via the first processing unit, the servo valve being configured to control a fuel metering device of the jet engine in order to monitor the thrust delivered by the jet engine, the second processing unit being configured to drive the movable portion of the servo valve and to determine the position of the movable portion relative to the fixed portion from signals emitted by the linear variable inductive displacement sensor.

4. The aircraft according to claim 3, wherein the first processing unit is configured to supply the primary coil and analyze signals induced by the first and second secondary coils in order to determine a position of the primary coil relative to the first and second secondary coils, ends of the primary coil, of the first secondary coil, and of the second secondary coil being connected to a common ground of the first processing unit.

5. The aircraft according to claim 3, wherein the first processing unit is configured to supply the primary coil and to analyze signals induced by the first and second secondary coils in order to determine a position of the magnetic core relative to the first and second secondary coils, the ends of the primary coil, of the first secondary coil and of the second secondary coil being connected to a common ground of the first processing unit.

* * * * *